Jan. 8, 1963 W. V. SMITH ET AL 3,072,890

ELECTRON SPIN ECHO STORAGE SYSTEM

Filed Dec. 15, 1958 4 Sheets-Sheet 1

United States Patent Office 3,072,890

Patented Jan. 8, 1963

3,072,890

ELECTRON SPIN ECHO STORAGE SYSTEM

William V. Smith, Chappaqua, and Peter P. Sorokin, Poughkeepsie, N.Y., assignors to International Business Machines Corporation, New York, N.Y., a corporation of New York Filed Dec. 15, 1958, Ser. No. 780,518
4 Claims. (Cl. 340—173)

Figure 1A:
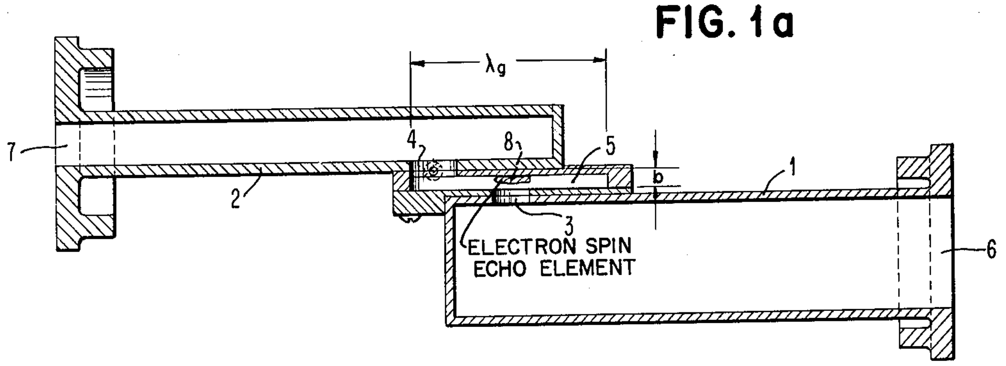

This invention relates to microwave resonant elements and more particularly to microwave apparatus for use in electron spin echo circuitry.

The storage of information by spin echo techniques has been studied in materials where the active storage units are the precessing magnetic moments of hydrogen nuclei, or protons, such as is described in detail in the article by Anderson et al., in the Journal of Applied Physics, volume 26, page 1324 (1955).

In a typical procedure if an incremental volume of a chemical substance is located in a strong uniform magnetic field for a sufficient period of time so as to be in thermal equilibrium, the resultant magnetic moment present in the material is aligned in the direction of the field. If an R. F. field or "information" pulse having a frequency equal to the characteristic of Larmor frequency of the substance is now applied at right angles to the field, a torque is applied to the moment which causes it to be turned away from the direction of the field. The angle of tipping, that is the angle between the moment and the direction of the field, is proportional to the magnitude of the field and the time during which the R.F. field exists. Upon release of the displacing force, the spinning nuclei, urged again toward realignment by the force of the field, rotate or precess about the field in much the same manner as a tipped gyroscope. The sample is then subjected to another R.F. field or "recollection" pulse directed normal to the main field. After a quiescent period the sample develops spontaneously a magnetic field of its own which is also normal to the main field and which rotates around the latter's direction. The strength of this rotating field builds up to a maximum and then decays, and is picked up inductively by a properly oriented coil, amplified and detected. This electrical pulse is termed a "spin echo."

Recent extensions of these studies indicate that a considerable improvement in speed of information input and output might be achieved by utilizing electron spin systems. The difference between electron and proton spin systems may be attributed to the two thousand fold smaller mass of the electron. This difference gives an electron spin a larger magnetic moment, in the order of $10^{-20}$ emu, as compared to $1.5\times10^{-23}$ emu for a spinning proton. Accordingly, the precessional frequency of the spinning electron is about 2.8 mc. per oersted as compared to 4.3 kc. per oersted for the proton. Thereby, in typical materials, the speed of response of an electron spin system to an imposed R.F. magnetic field pulse may be as high as seven hundred times faster than a proton based system. Stated in another way, the information rate may be improved by a reduction in the typical bit interval from a few microseconds required in proton systems to a few millimicroseconds. Furthermore, more complex operation is possible with systems based on electron spins. Electron spin echoes, for example, may be obtained from the couplings having effective spins greater than ½, a value of 5/2 for $Mn^{++}$ being readily achieved. In addition the electronic spin levels of the particular material chosen may have hyperfine structure resulting from different precessions of nuclear spins relative to electron spins. Furthermore, combinations of electron and nuclear spins may be arranged to achieve from one to thirty or more precessional frequencies in the same magnetic field.

The precessional or Larmor frequencies of electrons lie in the microwave range. Therefore suitable apparatus for applying a tipping field at the same microwave frequency as the Larmor frequency of the sample is required in memory storage systems based upon electron spin echoes. Furthermore such apparatus should inductively pick up the output spin echo signals without interference from the input signal. In general such a requirement may be satisfied by the proper design and construction of microwave resonators in which the spin sample may be contained and in which input and output pulses may be applied and collected. It has been the object of considerable research, therefore, to provide resonant elements having desirable physical characteristics for application in electron spin echo circuitry.

In the design of microwave resonant elements for high speed electron spin echo systems it is desirable to achieve a number of objectives simultaneously. Of particular importance is the requirement that the input and output modes be substantially isolated from each other so that there will be little leakage of the input signal into the receiver system. A further attribute of a resonant element for this purpose is that its "Q" value, which "Q" may be defined as $f/\Delta f$, where $f$ is the resonant frequency of the element, be quite low, preferably 100 or less. Stated in another way the band width, $\Delta f$, should be quite large so that relatively short signal pulses may be passed through the resonator. Another requirement is that the resonator element provide high microwave R.F. fields at the spin sample with a minimum of input power. If these objectives are satisfied recollection pulses of as low as 10 millimicrosecond duration at a center frequency of 10,000 megacycles may be achieved with microwave R.F. fields of about five oersteds.

Accordingly, it is an object of the present invention to construct an electron spin echo memory storage system.

A more specific object is to design an electron spin echo memory storage element wherein the electromagnetic input and output modes are isolated from each other.

Another object is to provide an electron spin echo memory storage element which has a low "Q" value.

Another object is to devise a microwave cavity capable of maintaining a high microwave R.F. field at the electron spin echo memory storage element with a minimum of input power.

A further object of this invention is to provide a strip-line microwave resonator having desirable physical characteristics for use with an electron spin echo memory storage element.

Among the other objects is to provide resonant elements having suitable waveguide coupling means associated therewith for use with an electron spin echo memory storage element.

These and other objects of the invention will be pointed out in the following description and claims and illustrated in the accompanying drawings, which disclose, by way of example, the principle of the invention and the best mode, which has been contemplated, of applying that principle.

Figure 1B:
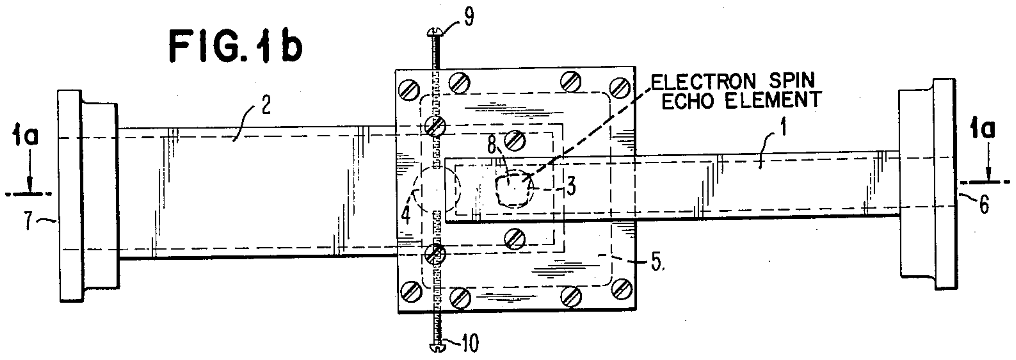

In the drawings:

FIGURE 1*a* is a full sectional view of a microwave resonator according to the present invention taken along lines 1*a* of FIGURE 1*b* and comprising a microwave cavity formed by the union of two waveguides having abutting flanges.

FIGURE 1*b* is a plan view of the same resonator.

Figure 1C:
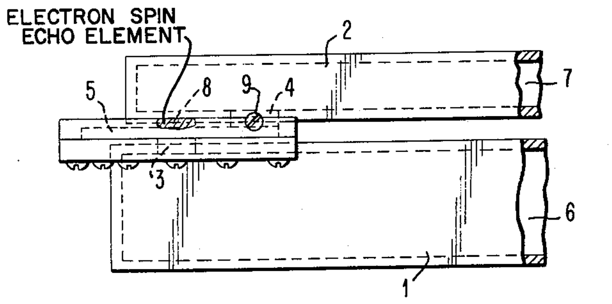

FIGURE 1*c* is a modification of the resonator in which both waveguides are on the same side of the cavity.

Figure 2:
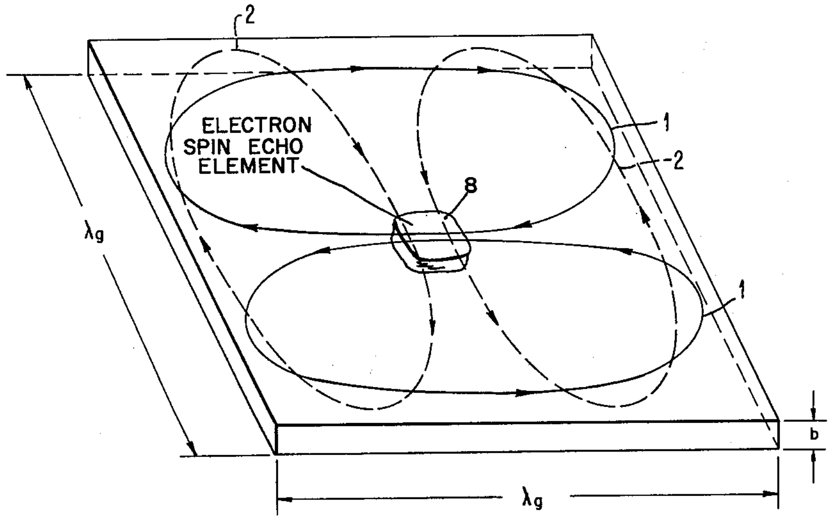

FIGURE 2 shows a schematic representation of the modes available in the resonant cavity according to the present invention.

Figure 3A:
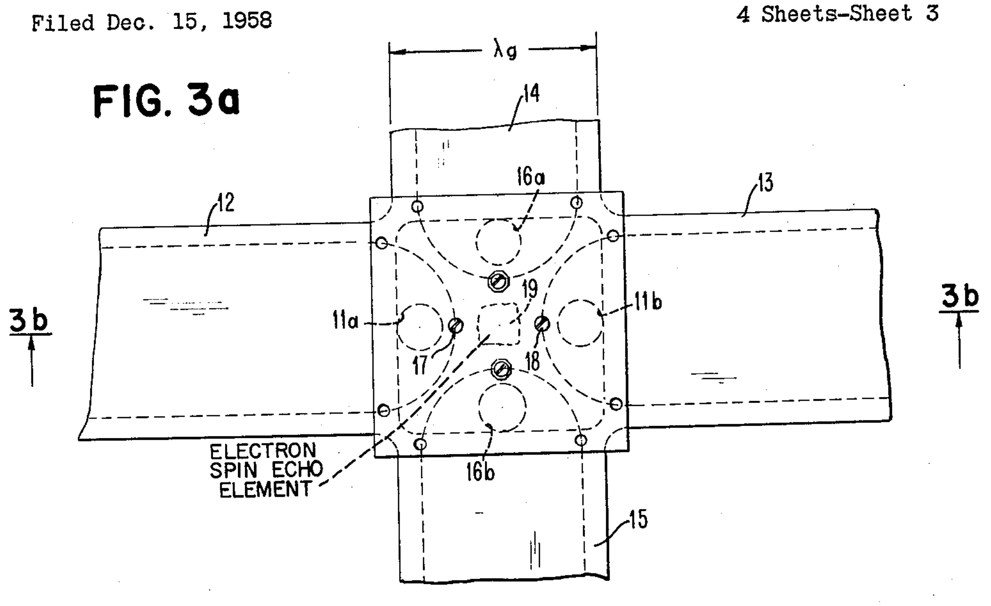

FIGURE 3*a* shows a plan view of an embodiment of the present invention in which the resonant cavity is located at the intersection of the four waveguides.

Figure 3B:
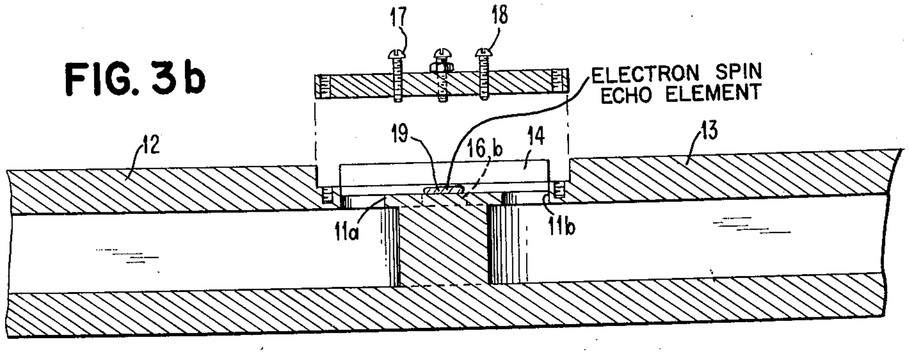

FIGURE 3*b* is a full sectional plan view taken along section lines 3*b* of FIGURE 3*a*.

Figure 3C:
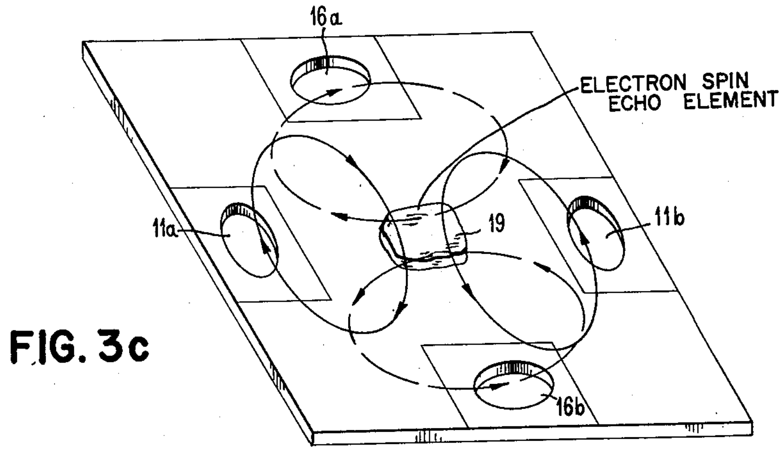

FIGURE 3*c* illustrates the modes present in the above cavity which are symmetrically coupled with the waveguides.

Figure 4A:
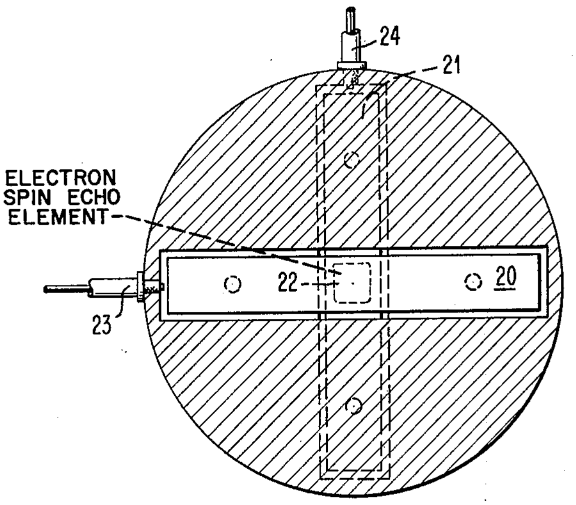

FIGURE 4*a* is a partial plan view of a stripline embodiment of the present invention.

Figure 4B:
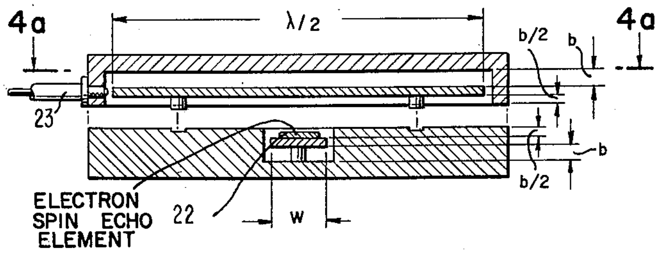

FIGURE 4*b* shows a full section of the stripline resonator taken along section lines 4*b* of FIGURE 4*a*.

Figures 5A, 5B, 5C, 5D, 5E:
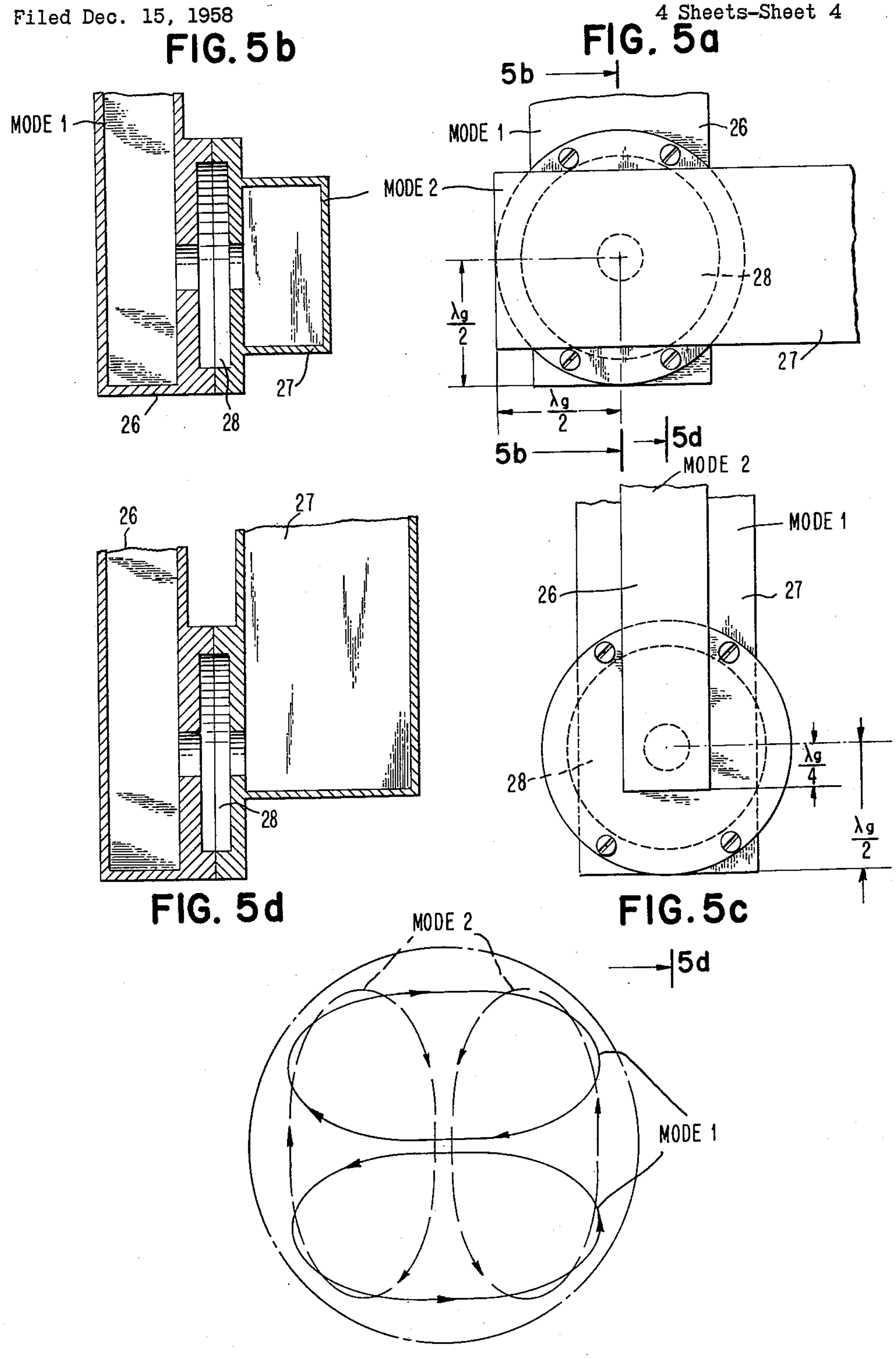

FIGURES 5*a* and 5*b* show a circular microwave resonator in which the cavity is formed from crossed waveguides at right angles to each other, with the coupling irises located in the center of each face, top and bottom.

FIGURES 5*c* and 5*d* show a similar resonator in which the waveguides are parallel to each other in one dimension and crossed in another.

FIGURE 5*e* shows the orthogonal modes present in the cavity of FIGURES 5*a–d*.

In general, microwave resonators may be formed of closed sections of coaxial lines or waveguides, called a cavity resonator, which may consist of a region of dielectric material completely enclosed by conducting walls. The shape of such cavity resonators is governed by such considerations as the desired values of resonance frequency, mode and "Q," and for the specific purpose for which they are intended.

Because propagation in cavity resonators may take place in more than one direction and in various modes, cavity resonators, in general, have a large number of possible modes of resonance. A cavity resonator, however, for a specific application may be designed and executed in such a manner that one or only several modes of resonance are obtained over a limited frequency range. Commonly used methods of tuning cavity resonators include changing the cavity shape, changing the values of lumped capacitance or inductance, and introducing conductors into the resonators in regions of high electric or magnetic field intensity.

The modes of propagation in a cavity resonator are designated by the manner in which the electric and magnetic fields are set up in the resonator and are designated by letters and subnumerals. One mode of transmission, known as TE, or transverse electric, indicates that the electric field is perpendicular to the sides of the waveguide and has no component along the length of the guide. Further characterization of the mode of resonance is obtained by designating sub-numbers along with the TE designation. For rectangular waveguides, for example, the first small number indicates the number of half-patterns of the radial component encountered in passing across one side of the cross section. The second number indicates the number of half-patterns of the radial component encountered in passing across the other side of the cross section. The smallest number of the two is listed first. In case there are no patterns, a zero is used. For circular waveguides the first two numbers in the mode symbol designate the mode of propagation of electromagnetic waves in the axial direction. The third number designates the number of half-wavelengths of the standing wave, in the axial direction.

The energy storage within the cavity resonator is roughly proportional to the volume whereas the energy loss at a given frequency is proportional to the surface area. At a fixed frequency and in a specific mode of excitation therefore, the "Q" is roughly proportional to the ratio of the volume to the surface area. For a specific shape and mode of excitation, on the other hand, the "Q" varies as a square root of the wavelength. By proper design and construction values of "Q" of any reasonable amount can be obtained in cavity resonators.

According to the practice of the present invention, microwave resonators are provided which exhibit desirable characteristics for operation in electron spin echo circuits. In brief the elements provided herein are characterized in that they provide input and output modes which are substantially isolated from each other; in that they exhibit a broad band pass or low "Q" value; and furthermore in that they provide a high microwave R.F. field at the sample with a minimum of input power.

One embodiment of a microwave resonator element according to the present invention is shown in FIGURE 1. Directing our attention at first to FIGURE 1*a* there is shown a pair of standard rectangularly-shaped waveguide components 1 and 2 placed narrow side to broad side to each other and having irises 3 and 4 at each end thereof. The waveguides are assembled in the manner shown to define a square resonant cavity 5 of long dimension $\lambda g$ and thickness *b*, and having available $TE_{021}$ and $TE_{012}$ modes. Each of said waveguides have ports, 6 and 7. Port 6, for example, may be used to couple the input electromagnetic energy to the cavity and port 7 to send the output pulses to the receiver. The sample 8 is placed in the center of the cavity where the magnetic R.F. field intensity for the two modes is a maximum. Tuning screws 9 and 10 are provided for fine adjustment of the resonant cavity. An external magnetic field may be employed where necessary.

A somewhat modified form of the resonator is shown in FIG. 1*c* wherein both waveguides are on the same side of the cavity. In this form the resonator may be conveniently inserted into a liquid helium both for operation at low temperatures.

FIGURE 2 shows in detail the principle of the operation of the resonant cavity of the resonator of FIGURE 1. The example shown is a square $TE_{021}$ and $TE_{012}$ mode rectangular resonant cavity, although other geometrical configurations, such as a right circular cavity, shown in FIGURE 5, may be used. The "Q" of the cavity of this invention may be made as small as desirable by decreasing the thickness dimension "*b*," without decreasing the magnetic field at the sample.

For small values of "*b*," the unloaded Q of the empty cavity may be defined as:

$$Q_0=\left(\frac{2\pi C}{\rho\lambda}\right)^{1/2}$$

$$\frac{V}{S}=\left(\frac{\pi C}{\rho\lambda}\right)^{b}$$

wherein c.g.s., $\rho$ the resistivity of the waveguide material is in abohm cm., V is the volume of the cavity, S=surface area of the cavity, C=speed of light, and $\lambda$ is the wavelength of the input pulse.

The unloaded Q is related to the microwave power input, P*i* and to the microwave magnetic field H*rf* by:

$$Q_E=Q_0=\omega\iiint\frac{Hrf^2}{8\pi}\Big\backslash Pi$$

for a critically coupled condition, where $Q_E$ is for the loaded line and $Q_0$ for the unloaded cavity. But $$\overline{H}rf^2=\frac{5}{16}Hs^2$$

and $$Q_0=\frac{5}{8}\,\frac{\omega VHs^2}{16\pi Pi}=\left(\frac{5}{8}\right)^2 c\lambda\frac{bHs^2}{4Pi}$$

Equating and solving for H*s* we have:

$$Hs^2=10.3\left(\frac{\pi}{P\lambda^3C}\right)1/2Pi\cdot$$

where P*i* is in ergs/sec.

These calculations demonstrate that for a given input power the tipping field at the sample H*s* is independent of the small dimension "*b*" of the cavity so long as it is kept small compared with $\tau$. The independence of H*s* on "$b$" allows "$b$" to be varied to achieve the desired low Q for the resonant cavity and still maintain a high field at the sample. For example, using a copper cavity whose $\lambda g$ is 3.2 cm. and since $$\lambda g^2 = \frac{5}{4}\lambda^2$$

and $\rho = 1.72 \times 10^3$ abohm cm.; for 1 watt$=10^7$ ergs/sec. input power and $Hs=3$ oersteds a Q of 100 is achieved if $b$ is 0.007 cm. Of course any desired low "Q" could be achieved with a larger $b$ by adding loss to the circuit. This, however, would decrease $Hs$, which is undesirable.

The resonator shown herein is employed as part of an electron spin echo system whose operation is similar to that for nuclear spin echoes and described in detail in, for example, U.S. 2,700,147. The operation of the electron based system which utilizes the resonator of this invention will be briefly described here. A pulse of microwave energy of proper frequency is transmitted through a waveguide or coaxial line into a resonator element in which is contained a sample material having a suitable spin system, on which an external magnetic field is applied. This pulse launches a first mode of the resonator whose magnetic field configurations are shown as unbroken lines in FIGURE 2. This field causes tipping of the spinning electrons in the sample, which in turn interact with the first mode of the resonator to launch an output field 2 having a magnetic field configuration represented by the broken lines of FIGURE 2. The two fields are orthogonal, and are substantially isolated or decoupled from each other. A short time after application of this pulse the spins in the sample lose phase coherence and no longer couple the two cavity modes. At a suitable time interval, a spin reversal pulse is applied to the sample through the input waveguide 1. After another time interval, an output pulse or spin echo signal is received which is then coupled to the receiver. A wide variety of modifications of this pulse sequence is possible. In particular, many information pulses may be stored sequentially before application of an appropriate recollection pulse. The orthogonality of the input and output fields protects the receiver from the large burst of input microwave energy from the transmitter.

A more complete decoupling of the two modes while maintaining frequency degeneracy may be achieved with the symmetrical cavity arrangement as shown in FIGURE 3. Irises 11*a* and 11*b* are transmitter ports which are coupled symmetrically to the cavity waveguides 12 and 13 to provide the instantaneous R.F. magnetic field configurations which are parallel in 11*a* relative to 11*b*, as shown most particularly in FIGURE 3*c*. This phase relation may be obtained by directing the microwave energy through appropriate arms of a magic T or in other ways well known in the art. Irises 16*a* and 16*b* are for the purpose of collecting the spin echo pulses. Tuning screws 17 and 18 are provided to improve the final adjustment of the degeneracy and orthogonality of excitation in the cavity. The sample 19 is positioned in the region of maximum magnetic field intensity where the electromagnetic fields of the modes cross orthogonally to each other, thereby providing a high field at the electron spin sample.

A stripline version of the resonator of the present invention is shown in FIGURE 4. In this design strips of metal 20 and 21 are crossed to form nearly double cavities with a small region geometrically in common. In the structure shown, $Hrf$ is a maximum at the center of the strips, top and bottom, and zero at the ends of the strips. The field at the sample 22 is somewhat larger in this embodiment than in the waveguide case. The input microwave energy may be coupled to the strip line cavity by means of probe or coax-to-strip line transition 23 and the output pulse coupled to the receiver in the same manner through coupler 24. There is no direct feedthrough from one load to another in this version because the probes for a given mode are in a region where the field of the other mode is a minimum. The "Q" of this version is likewise low as long as $b$ is made small.

The waveguide resonator of the present invention may be formed as shown in FIGURE 5 using circular waveguides 25 and 26 crossed either at right angles (FIGS. 5*a* and 5*b*) or parallel to each other (FIGS. 5*c* and 5*d*). In both arrangements the narrow side of one waveguide is connected to the broad side of the other waveguide. The cavity 28 is located between the crossed waveguides which have coupling irises 28 and 29, one in the center of each face, top and bottom. The orthogonal electromagnetic field configurations are shown in FIG. 5*c*.

Examples of favorable sample substances for electron spin systems are paramagnetic substances, such as transition element ions in host crystals, organic free radicals, or alkali atom impurities in inorganic crystals.

The microwave resonant element shown herein provides cavities analogous to nuclear resonance crossed coils, having the physical characteristics required for use in electron spin storage systems, with the input signal decoupled from the output by the symmetry of the construction and at the same time a low "Q" value with a high field at the sample for minimum input power.

The utility of the apparatus of the present invention was demonstrated by using the symmetrical spin echo resonance cavity embodiment shown in FIGURE 3 in a typical spin echo experiment. A 40 db broad band isolation between input and output modes was achieved. Free induction decay of the free radical diphenylpicrylhydrazyl, "DPPH" was observed at room temperature with a signal to leakage pulse ratio of about 40 to 1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An information storage system comprising a high efficiency microwave resonant cavity characterized by operation in the degenerate mode and having simultaneously a Q below 100, and wherein one dimension of the cavity is small compared with the operating wavelength, a paramagnetic electron spin echo chemical substance located in the center of said cavity, means for supplying a storage pulse to said cavity, means for supplying a recollection pulse to said cavity, and means for coupling an output pulse from the electron spin echo material to external circuit means a short time interval after the recollection pulse from said last name means, said input means and said output means being substantially isolated from each other.

2. An information storage system as set forth in claim 1, wherein the resonant cavity is square in cross-section and is operable in the $T_{012}$ and the $TE_{021}$ modes.

3. An information storage system as set forth in claim 1, wherein the resonant cavity is circular in cross-section, and is operable in the $TE_{012}$ and the $TE_{021}$ modes.

4. An information storage system as set forth in claim 1, wherein the resonant cavity comprises the common area between two stripline conductors lying in closely spaced parallel planes, said striplines being transverse to each other and wherein one stripline supplies input and recollection pulses to the electron spin echo chemical substance and the other stripline couples the output pulses from said material to the external circuitry.

(References on following page)

References Cited in the file of this patent

UNITED STATES PATENTS

| | | |
|---|---|---|
| Re. 23,950 | Bloch et al. | Feb. 22, 1955 |
| 2,700,147 | Tucker | Jan. 18, 1955 |
| 2,825,765 | Marie | Mar. 24, 1958 |
| 2,948,868 | Reeves | Aug. 9, 1960 |
| 2,958,045 | Anderson | Oct. 25, 1960 |
| 2,978,649 | Weiss | Apr. 4, 1961 |

FOREIGN PATENTS

| | | |
|---|---|---|
| 563,913 | Belgium | Jan. 31, 1958 |

OTHER REFERENCES

Anderson et al.: Journal of Applied Physics, vol. 26, No. 11, November 1955, pages 1324–1338.

Weiss: Physical Review, vol. 107, No. 1, July 1, 1957, page 317.

Chang et al.: Proceedings of the IRE, July 1958, pages 1383–1386.

Wittke: Proceedings of the IRE, March 1957, pages 291–316.

Spencer et al.: Proceedings of IRE, June 1956, pages 790–800 (page 797 relied on).

Journal of Applied Physics, April 1957, page 511.

McWhorter et al.: Physical Review, vol. 109, No. 2, Jan. 15, 1958, pages 312–318.

Artman et al.: Journal of Applied Physics, September 1955, pages 1124–1132.

Nelson: Proceedings of IRE, October 1956, pages 1449–1455.

Whirry et al.: "IRE Transactions on Microwave Theory and Techniques," January 1958, pages 59–65.

Darrow: "Bell System Technical Journal," January and March 1953, pages 74–99 and 384–405 respectively.

UNITED STATES PATENT OFFICE

CERTIFICATE OF CORRECTION

Patent No. 3,072,890 — January 8, 1963

William V. Smith et al.

It is hereby certified that error appears in the above numbered patent requiring correction and that the said Letters Patent should read as corrected below.

Column 2, line 29, for "sample" read -- angle --; column 4, line 26, for "both" read -- bath --; lines 51 to 54, the formula should appear as shown below instead of as in the patent:

$$Q_E = Q_O = \frac{\omega \iiint}{V} \; \frac{Hrf^2}{8\pi} \Big/ Pi$$

same column 4, line 75, for "$\tau$" read -- $\lambda$ --; column 6, line 62, for "$T_{012}$" read -- $TE_{012}$ --.

Signed and sealed this 28th day of April 1964.

(SEAL)
Attest:

ERNEST W. SWIDER — EDWARD J. BRENNER

Attesting Officer — Commissioner of Patents